US011641241B2

(12) United States Patent
Sadot et al.

(10) Patent No.: US 11,641,241 B2
(45) Date of Patent: May 2, 2023

(54) OPTICAL COMMUNICATION SYSTEM USING MODE-LOCKED FREQUENCY COMB AND ALL-OPTICAL PHASE ENCODING FOR SPECTRAL AND TEMPORAL ENCRYPTED AND STEALTHY TRANSMISSION, AND FOR OPTICAL PROCESSING-GAIN APPLICATIONS

(71) Applicant: B.G. NEGEV TECHNOLOGIES AND APPLICATIONS LTD., AT BEN-GURION UNIVERSITY, Beer Sheva (IL)

(72) Inventors: Dan Sadot, Kfar Bilu (IL); Eyal Wohlgemuth, Moshav Haniel (IL); Yaron Yoffe, Rishon Lezion (IL)

(73) Assignee: CYBERRIDGE LTD., Tel Aviv-Jaffa (IL)

( * ) Notice: Subject to any disclaimer, the term of this patent is extended or adjusted under 35 U.S.C. 154(b) by 0 days.

(21) Appl. No.: 17/626,905

(22) PCT Filed: Jul. 14, 2020

(86) PCT No.: PCT/IL2020/050788
§ 371 (c)(1),
(2) Date: Jan. 13, 2022

(87) PCT Pub. No.: WO2021/009754
PCT Pub. Date: Jan. 21, 2021

(65) Prior Publication Data
US 2022/0360337 A1 Nov. 10, 2022

Related U.S. Application Data

(60) Provisional application No. 62/873,912, filed on Jul. 14, 2019.

(51) Int. Cl.
*H04B 10/00* (2013.01)
*H04B 10/54* (2013.01)
(Continued)

(52) U.S. Cl.
CPC ............. *H04B 10/54* (2013.01); *H04B 10/85* (2013.01)

(58) Field of Classification Search
CPC combination set(s) only.
See application file for complete search history.

(56) References Cited

U.S. PATENT DOCUMENTS

| 7,831,049 | B1 | 11/2010 | Kanter | |
|---|---|---|---|---|
| 2010/0074444 | A1* | 3/2010 | Etemad | H04B 10/85 380/42 |
| 2011/0255554 | A1 | 10/2011 | Delfyett | |

FOREIGN PATENT DOCUMENTS

| CN | 102055584 B | 12/2012 |
|---|---|---|
| EP | 2705622 B1 | 3/2014 |

OTHER PUBLICATIONS

Apostolos Argyris et al., "Chaos-based communications at high bit rates using commercial fibre-optic links", Nature, Letters, vol. 437, Nov. 17, 2005.

(Continued)

*Primary Examiner* — Daniel G Dobson
(74) *Attorney, Agent, or Firm* — Cantor Colburn LLP

(57) ABSTRACT

A method for transmitting data carrying optical information over an optical channel, comprising the steps of providing an optical transmitter consisting of a light source being a Mode-Locked Optical Frequency Comb (MLFC) for generating a frequency comb of multiple carriers, each of which being modulated by a baseband signal; an optical modulator for modulating each and all of the multiple carriers in a modulation bandwidth extending up to the modes' frequency spacing between the multiple carriers; performing (Continued)

all-optical encoding of the modulated carriers by manipulating the optical amplitude and/or phase and/or polarization of all optically modulated carriers; and transmitting, by the optical transmitter, the encoded modulated carriers to an optical receiver, over an optical channel.

18 Claims, 2 Drawing Sheets

(51) Int. Cl.
  *H04B 10/85* (2013.01)
  *H04J 14/00* (2006.01)

(56) References Cited

OTHER PUBLICATIONS

Ben Wu et al., "Chapter 11: Secure Communication in Fiber-Optic Networks", Princeton University, 2014.
Ben Wu et al., "Optical steganography based on amplified spontaneous emission noise", Optical Society of America, Optics Express, vol. 21, No. 2, Jan. 28, 2013.
Bernard B. Wu et al., "A method for secure communications over a public fiber-optical network", Optics Express, vol. 14, No. 9, May 1, 2006.
Bernard Wu et al., "Steganographic Fiber-Optic Transmission using Coherent Spectral-Phase-Encoded Optical CDMA", CFF5.pdf, OSA/CLEO/QELS, 2008.
Boris Korzh et al., "Provably secure and practical quantum key distribution over 307 km of optical fibre", Nature Photonics, vol. 9, Feb. 9, 2015.
Dan M. Marom et al., "Wavelength-Selective 1 × K Switches Using Free-Space Optics and MEMS Micromirrors: Theory, Design, and Implementation", Journal of Lightwave Technology, vol. 23, No. 4, Apr. 2005.
Eyal Wohlgemuth et al., "Demonstration of coherent stealthy and encrypted transmission for data center interconnection", Optics Express, vol. 26, No. 6, Mar. 19, 2018.
Eyal Wohlgemuth et al., "Demonstration of Stealthy and Encrypted Optical Transmission Below Adjacent 50 GHz DWDM Channels", IEEE Photonics Technology Letters, vol. 32, No. 10, May 15, 2020.
Frank Arute et al., "Quantum supremacy using a programmable superconducting processor", Nature, Voo. 574, Oct. 24, 2019.
Georgios Tzimpragos et al., "A Survey on FEC Codes for 100 G and Beyond Optical Networks", IEEE Communication Surveys & Tutorials, vol. 18, No. 1, First Quarter 2016.
Govind P. Agrawal, "Fiber-Optic Communication Systems, Third Edition", The Institute of Opics, University of Rochester, A John Wiley & Sons, Inc., Publication, 2002.
Hoi-Kwong Lo et al., "Secure quantum key distribution", Nature Photonics, vol. 8, Aug. 2014.
International Search Report issued in Application No. PCT/IL2020/050788 dated Oct. 25, 2020, 4 pages.
Jawad A. Salehi et al., "Coherent Ultrashort Light Pulse Code-Division Multiple Access Communication Systems", Journal of Lightwave Technology, vol. 8, No. 3, Mar. 1990.
Keith Shaneman et al., "Optical Network Security: Technical Analysis of Fiber Tapping Mechanisms and Methods for Detection & Prevention", IEEE Military Communicaitons Conference, 2004.
Ken-Ichi Kitayama et al., "OCDMA over WDM PON-Solution Path to Gigabit-Symmetric FTTH", Journal of Lightwave Technology, vol. 24, No. 4, Apr. 2006.
Kim Roberts et al., "Beyond 100 Gb/s: Capacity, Flexibility, and Network Optimization [Invited]", Journal of Optical Communication Networks, vol. 9, No. 4, Apr. 2017.
Lynn E. Nelson et al., "A Robust Real-Time 100G Transceiver With Soft-Decision Forward Error Correction [Invited]", Journal Optical Communication Network, vol. 4, No. 11, Nov. 2012.

M. Deseada Gutierrez Pascual et al., "Photonic Integrated Gain Switched Optical Frequency Comb for Spectrally Efficient Optical Transmission Systems", IEEE Photonics Journal, vol. 9, No. 3, Jun. 2017.
M. Deseada Gutierrez Pascual et al., "Software reconfigurabie highly flexible gain switched optical frequency comb source", Optics Express, vol. 23, No. 18, Sep. 7, 2015.
M. Zafar iQBAL et al., "Optical Fiber Tapping: Methods and Precautions", IEEE, 2011.
Mable P. Fok et al., "Optical Layer Security in Fiber-Optic Networks", IEEE Transactions on Information Forensics and Security, vol. 6, No. 3, Sep. 2011.
Mikael Mazur et al., "High Spectral Efficiency PM-128QAM Comb-Based Superchannei Transmission Enabled by a Single Shared Optical Pilot Tone", Journal of Lightwave Technology, vol. 36, No. 6, Mar. 15, 2018.
Muhammad Imran et al., "A Survey of Optical Carrier Generation Techniques for Terabit Capacity Elastic Optical Networks", IEEE Communications Surveys & Tutorials, vol. 20, No. 1, First Quarter 2018.
Natalie Kostinski et al., "Demonstration of an All Optical OCDMA Encryption and Decryption System With Variable Two-Code Keying", IEEE Photonics Technology Letters, vol. 20, No. 24, Dec. 15, 2008.
P.M. Anandarajah et al., "Generation of Coherent Multicarrier Signals by Gain Switching of Discrete Mode Lasers", IEEE Photonics Journal, vol. 3, No. 1, Feb. 2011.
Peter J. Winzer et al., "Fiber-optic transmission and networking: the previous 20 and the next 20 years [Invited]", Optics Express, vol. 26, No. 18, Sep. 3, 2018.
Prajwal D. Lakshmijayasimha et al., "Expansion and phase correlation of a wavelength tunable gain-switched optical frequency comb", Optics Express, vol. 27, No. 12, Jun. 10, 2019.
Qiang Wang et ai., "Study of All-Optical XOR Using Mach-Zehnder Interferometer and Differential Scheme", IEEE Journal of Quantum Electronics, vol. 40, No. 6, Jun. 2004.
Ridha Rejeb et al., "Fault and Attack Management in All-Optical Networks", Topics in Optical Communications, IEEE Communicaitons Magazine, Nov. 2006.
Rui Zhou et al., "40nm wavelength tunable gain-switched optical comb source", Optical Society of America, Optics Express, vol. 19, No. 26, Dec. 12, 2011.
Rui Zhou et al., "Phase noise analysis of Injeted gain switched comb source for coherent communications", Optics Express, vol. 22, No. 7, Apr. 7, 2014.
Shahab Etemad et al., "An Overlay Photonic Layer Security Approach Scaleable to 100Gb/s", Topics in Optical Communicaitons, IEEE Communications Magazine, Aug. 2008.
Thomas H. Shake, "Security Performance of Optical CDMA Against Eavesdropping", Journal of Lightwave Technology, vol. 23, No. 2, Feb. 2005.
Tomer Yeminy et al., "Spectral and temporal stealthy fiber-optic communication using sampling and phase encoding", Optics Express, vol. 19, No. 21, Oct. 10, 2011.
Victor Torres-Company et al., "Laser Frequency Combs for Coherent Optical Communications", Journal of Lightwave Technology, vol. 37, No. 7, Apr. 1, 2019.
Wei Huang et al., "Coherent Optical CDMA (OCDMA) Systems Used for High-Capacity Optical Fiber Networks-System Description, OTDMA Comparison, and OCDMA/WDMA Networking" Journal of Lightwave Technology, vol. 18, No. 6, Jun. 2000.
Wei Huang et al., "Coherent Optical Pulse CDMA Systems Based on Coherent Correlation Detection", IEEE Transactions on Communications, vol. 47, No. 2, Feb. 1999.
Written Opinion issued in Application No. PCT/IL2020/050788 dated Oct. 25, 2020, 5 pages.
Yohei Aikawa et al., "Demonstration of All-Optical Divider Circuit Using SOA-MZI-Type XOR Gate and Feedback Loop for Forward Error Detection", Journal of Lightwave Technology, vol. 29, No. 15, Aug. 1, 2011.

(56) References Cited

OTHER PUBLICATIONS

Z. Jiang et al., "Experimental Investigation of Security Issues in OCDMA", Optical Society of America, Fiber optics communcations, 2006.

* cited by examiner

OPTICAL COMMUNICATION SYSTEM USING MODE-LOCKED FREQUENCY COMB AND ALL-OPTICAL PHASE ENCODING FOR SPECTRAL AND TEMPORAL ENCRYPTED AND STEALTHY TRANSMISSION, AND FOR OPTICAL PROCESSING-GAIN APPLICATIONS

CROSS REFERENCE TO RELATED APPLICATIONS

This application is a U.S. National Stage application of PCT/IL2020/050788, filed Jul. 14, 2020, which claims the benefit of U.S. Provisional Application No. 62/873,912, filed Jul. 14, 2019, both of which are incorporated by reference in their entireties herein.

FIELD OF THE INVENTION

The present invention relates to the field of optical data encryption. More particularly, the invention relates to an optical communication system using mode-locked frequency comb and all-optical phase encoding for spectral and temporal encrypted and stealthy transmission, and for optical processing-gain applications.

BACKGROUND OF THE INVENTION

As the demand for bandwidth is scaling up to unprecedented levels, information confidentiality, integrity and availability are becoming increasingly important, particularly in sensitive applications such as financial transactions, military, medical records, and private information sharing. The optical infrastructure poses a major data breach, as it is exposed to various attacks such as fiber tapping, false data injection and jamming. To cope with these considerable security threats, common encryption protocols are implemented in all seven layers of the Open Systems Interconnection (OSI) model. Such protocols rely on prime factorization and high computational complexity algorithms. However, in the era of supercomputing and quantum computing, any digital encryption scheme can be decrypted in theory, as the valuable raw data can be recorded and processed offline by supercomputers. Moreover, in upper layers standard encryption techniques, metadata remains unencrypted, as well as the existence of the transaction itself, and might be used by an adversary for eliciting sensitive information on the users by data mining techniques.

Security schemes by all-optical means, also known as optical layer security or photonic layer security (PLS), have been proposed, in order to overcome this problem [5]. Such a solotion augments the security performances of the entire communication network, as it offers many unique advantages over digital security protocols. In particular, it enables real-time, low-latency, low-power operation, which cannot be provided by conventional security algorithms at current line rates, which exceed 1.3 Tbps per a single wavelength [6]. Additionally, side-channel attacks can be prevented since all-optical processing does not generate electromagnetic radio frequency (RF) signatures. Several approaches for optical layer security have been widely investigated, including chaos-based communications [7], quantum communication [8], all-optical logic [9, 10], and spread spectrum techniques [11-15].

In chaos-based communications, the user message is transmitted using a chaotic signal carrier, which is very sensitive to initial hardware conditions, and is generated by a laser diode that contains optoelectronic feedback or optical feedback. At the receiver, the information is retrieved upon synchronization with the transmitter [7]. However, chaotic optical transceivers require complex laser structures and are extremely unstable. Furthermore, the throughput is greatly restricted by the intrinsic relaxation oscillation frequency of chaotic signal.

All-optical processing techniques such as optical XOR gates have been also suggested in [9, 10], utilizing nonlinearity phenomenons such as Four-Wave Mixing (FWM) in saturated Semiconductor Optical Amplifier (SOA). Though it complies with conventional implementations and WDM networks, in the sense of security performance, all-optical logic essentially does not provide substantial added value over digital Phusical layer (PHY) encryption.

For that reason, chaos-based communications and all-optical logic were not widely adopted in deployed fiber-optics networks. On the other hand, quantum key distribution (QKD) [16] is considered unconditionally secured (i.e. completely resilient against cryptanalytic attacks). However, its performances are still incomparable with the other encryption methods, as bitrate-distance (B·L) product is limited only to several Mbits/second×km [8]. Consequently, it is mainly considered for key exchange protocol, rather than for encrypting the data in a full line-rate.

An additional existing approach is optical code-division multiple access (OCDMA) [17]. It is a Spread Spectrum (SS) technique proposed for OCDMA passive optical networks (OCDMA-PONs) [18] application. In OCDMA, different users whose signals may be overlapped both in time and frequency share a common fiber and laser source. Multiple asynchronous access is achieved by minimal multi-user interference (MUI) of the optical codes (OCs). The broadband spectrum in OCDMA is provided by Optical Frequency Combs (OFC) which are in general considered highly attractive for next generation optical communications [19, 20]. First, they can serve as multi-carrier sources in WDM systems for both the signal's carrier and the local oscillator (LO), replacing tens of tunable continuous-wave lasers by a single source. Secondly, the OFC enables to significantly simplify the coherent receiver by realizing a joint digital signal processing for phase recovery.

In turn, OCDMA has been suggested for encryption purposes as well [11-15], since eliminating the MUI provides a certain level of authentication. The generation of Optical Code (OC) is provided by Spectral Phase Encoding (SPE) or by a multiplication with direct sequences (DS) in the time domain. In SPE, the OC can be inscribed by either a FIBER BRAGG GRATING (FBG) or obtained by a dynamic Spatial Light Modulator (SLM) [21]. However, the FBG is passive and cannot fit to encryption needs, where dynamic key changing is required. Therefore, for encryption application, a dynamic, short settling time optical engine should be provided such as SLM based-devices or demutiplexer and an array of phase shifters.

Traditionally, OCDMA has been classified into incoherent OCDMA and coherent OCDMA (Co-OCDMA), where in coherent OCDMA, coherent detection is obtained by mixing with a pulsed Local Oscillator (LO) [22, 23]. It was proven that intensity modulated (incoherent) OCDMA signals are significantly vulnerable to attacks [11, 24] using an energy detector with bandwidth limited to the bit rate, which is unable to resolve the fine structure of the noise-like waveforms, but integrates the energy in a bit period. On the other hand, a Co-OCDMA offers many benefits of the complex modulation scheme such as improved sensitivity, polarization diversity and more. Nevertheless, given the advance in coherent detectors and digital signal processing, Co-OCDMA may become vulnerable to bandwidth limited detection, same as incoherent OCDMA.

The gap between the data security needs and the available encryption techniques requires a new encryption method that is immune to traffic analysis, provides a stealthy transmission and enables scalable higher key change rates and low cost implementation.

It is therefore an object of the present invention to provide an optical communication system using mode-locked frequency comb and all-optical phase encoding for spectral and temporal encrypted and stealthy transmission, and for optical processing-gain applications.

It is another object of the present invention to provide an encryption method that is immune to traffic analysis, provides a stealthy transmission and enables scalable higher key change rates and low cost implementation.

Other objects and advantages of the invention will become apparent as the description proceeds.

SUMMARY OF THE INVENTION

A method for transmitting data carrying optical information over an optical channel, comprising the steps of:
  a) Providing an optical transmitter consisting of:
    a.1) a light source being a Mode-Locked Optical Frequency Comb (MLFC) for generating a frequency comb of multiple carriers, each of which being modulated by a baseband signal;
    a.2) an optical modulator for modulating each and all of the multiple carriers in a modulation bandwidth extending up to the modes' frequency spacing between the multiple carriers;
    a.3) performing all-optical encoding of the modulated carriers by manipulating the optical amplitude and/or phase and/or polarization of all optically modulated carriers; and
  b) transmitting, by the optical transmitter, the encoded modulated carriers to an optical receiver, over an optical channel.

Masking encoded modulated carriers before transmission may be performed by:
  a) attenuating the power of encoded modulated carriers; and
  b) optionally, adding noise to the attenuated encoded modulated carriers, in a level being optionally above the power.

All-optical decoding of the modulated carriers may be performed by de-manipulating the optical phase and/or amplitude and/or phase of all optically modulated carriers.

Processing-gain may be obtained by performing optical coherent addition of all the optical modes of the frequency comb of multiple carriers using "multi-homodyne" detection.

Multi-homodyne detection may be performed by:
  a) combining the received signal with a mode-locked optical frequency comb which operates as the optical multi-frequency local oscillator;
  b) applying opto-electronic coherent detection of the combined optical signal;
  c) performing baseband filtering of the "multi-homodyne" mixed signal between the identical frequencies of the two frequency combs at the receiver and the transmitter, by passing the photo-detected signal through a receiver of bandwidth narrower than the frequency spacing between the modes;
  d) filtering out all the detected cross-term mixing products between the two frequency combs.

Multi-direct-detection may be performed by:
  a) applying self-homodyne opto-electronic direct-detection of the optical signal;
  b) Performing baseband filtering of the "multi-direct-detection" signal;
  c) passing the photo-detected signal through a receiver of bandwidth narrower than the frequency spacing between the modes, thereby filtering out all the cross-term mixing between the multi-frequencies of the comb.

In one aspect, multiple spectral replicas of the signal are coherently added to the baseband, to reinforce the signal-to-noise ratio.

The opto-electronic receiver may have a baseband bandwidth, rather than a full optical bandwidth.

A spectral may be applied phase mask being an encryption key, for obtaining secure transmission.

Processing-gain may be used for optoelectronic amplification at the receiver, for limited link budget applications and/or limited output power transmission.

The optical channel may a wired or wireless channel, selected from the group of:
  glass;
  plastic fiber;
  Free-Space Optics (FSO);
  random media.

The modulation is complex or intensity modulation.

The optical bandwidth of the all-optical encoder may cover the applicable spectrum of the MLFC, and can induce a temporal phase retardation to spread each symbol over multiple symbol's unit intervals (Uls).

The system may operating at high optical-noise conditions at very low, possibly negative, Optical-Signal-To-Noise-Ratio (OSNR), followed by performing high optical processing-gain at the receiver side.

The detected cross-terms may contain energy at frequencies larger than the baseband filter.

An optical system for transmitting data carrying optical information over an optical channel, comprising:
  a) an optical transmitter, that comprises:
    a.1) a light source being a Mode-Locked Optical Frequency Comb (MLFC) for generating a frequency comb of multiple carriers, each of which being modulated by a baseband signal;
    a.2) an optical modulator for modulating each and all of the multiple carriers in a modulation bandwidth extending up to the modes' frequency spacing between the multiple carriers;
    a.3) an optical encoder for all-optical encoding of the modulated carriers by manipulating the optical amplitude and/or phase of all optically modulated carriers,
  wherein the transmitter is adapted to transmit, by the optical transmitter, the encoded modulated carriers to an optical receiver, over an optical channel; and
  b) an optical receiver comprising means for performing coherent addition by:
    b.1) combining the received signal with a mode-locked optical frequency comb which operates as the optical multi-frequency local oscillator;
    b.2) applying opto-electronic coherent detection of the combined optical signal;
    b.3) performing baseband filtering of the "multi-homodyne" mixed signal between the identical frequencies of the two frequency combs at the receiver and the transmitter, by passing the photo-detected signal through a receiver of bandwidth narrower than the frequency spacing between the modes;

b.4) filtering out all the detected cross-term mixing products between the two frequency combs.

An optical system for transmitting data carrying optical information over an optical channel, comprising:

a) an optical transmitter, that comprises:
   a.1) a light source being a Mode-Locked Optical Frequency Comb (MLFC) for generating a frequency comb of multiple carriers, each of which being modulated by a baseband signal;
   a.2) an optical modulator for modulating each and all of the multiple carriers in a modulation bandwidth extending up to the modes' frequency spacing between the multiple carriers;
   a.3) an optical encoder for all-optical encoding of the modulated carriers by manipulating the optical amplitude and/or phase of all optically modulated carriers, wherein the transmitter is adapted to transmit, by the optical transmitter, the encoded modulated carriers to an optical receiver, over the optical channel; and b) an optical receiver comprising a photodiode for performing incoherent detection by:
   b.1) detecting the signal's intensity by applying self-homodyne opto-electronic direct-detection of the modulated optical signal;
   b.2) filtering the baseband of the "multi-direct-detection" signal;
   b.3) filtering out all the cross-term mixing products between the multi-frequencies of the comb by passing the photo-detected signal through the optical receiver, the optical receiver having a bandwidth being narrower than the frequency spacing between modes.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

Figure 1:
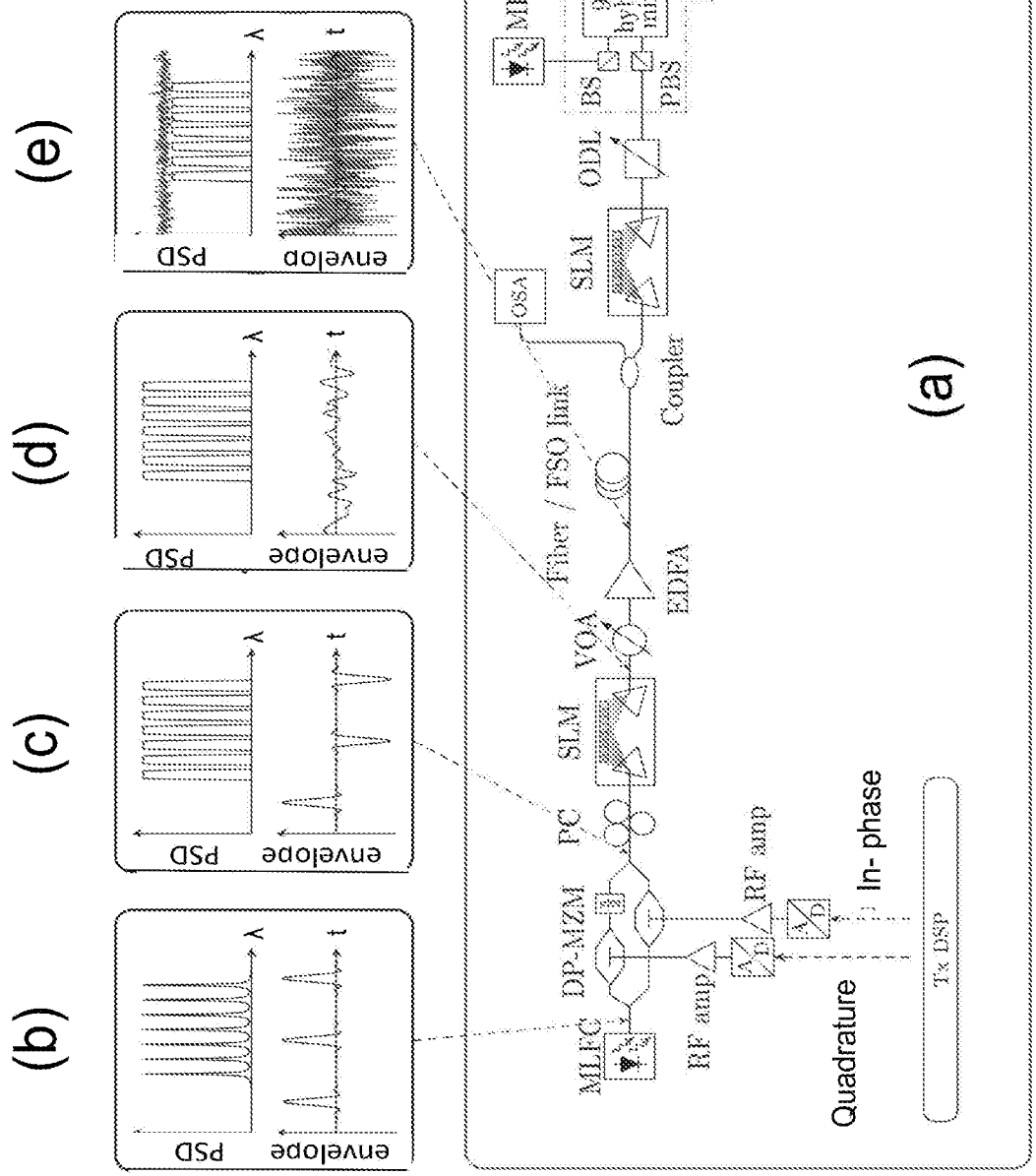
FIG. 1 illustrates the system functional block diagram with complex modulation and homodyne detection.

The present invention proposes an optical communication system using Mode-Locked Frequency Comb (MLFC-which is a laser source that before modulation, generates multiple optical carriers) and all-optical phase encoding for spectral and temporal encrypted and stealthy transmission, and for optical processing-gain applications.

The Mode-Locked Frequency Comb (MLFC) generates equally spaced optical carriers based on the same source, such that all the carriers have the same optical phase. This way, the symbol (the electrical signal with a particular spectrum) to be transmitted by modulating a carrier signal is replicated n times, such that its bandwidth becomes n times wider.

The electrical signal then modulates an al the multiple optical carriers generated by the MLFC, such that its baseband PSD is replicated in the frequency domain. Practically, the modulating signal is multiplied by all carriers (which is a sum of multiple sine waves). The total bandwidth of the replicated signal is broadened to the optical bandwidth of the frequency comb, which is much wider than the capabilities of the electronics.

After modulation, a spectral phase encoder is used to manipulate the phase of each replica by a unique pattern, in order to apply a phase mask, which is used for encryption. The spectral phase encoding can be done for example, by using a Spatial Light Modulator (SLM). An encoding key is used for phase encoding of all modulated carriers, such that the information carried by each carrier is masked by shifting the phase of each (modulated) carrier by a different unique phase, which may have a random value, for example.

At this stage, the signal is spread in the time domain in a form that corresponds to the unique pattern encoded by the phase mask. The combination of frequency comb and phase encoding, generated an encrypted optical signal.

At the next step, all the modulated the optical information is covered below a predetermined noise level. Practically, in the presence of noise, the signal cannot be detected without applying an inverse phase mask (phase decoding). This can be done by substantially attenuating the encrypted optical signal power (e.g., by 30 dB) and then, optionally adding additive noise to the attenuated encrypted optical signal, such that its magnitude will be optionally below the noise level, so as to obtain stealthy transmission. It should be noted that masking may be obtained only by attenuating the encrypted optical signal. Additive noise may be obtained, for example, by adding the output of an optical amplifier to the optical channel (the optical amplifier does not amplify the signal—it is used only as a white noise source, for masking the modulated signal). Therefore, the transmitted signal comprises the optical information masked by noise.

An eavesdropper who wishes to decode the transmitted data will not be able to do it, since he will have to record the masked optical information, for further analysis. However, as soon as the masked optical information is recorded (by electrical means), the optical phase encoding pattern ceases, and there will be no way to recover it. This way, the optical information masked by noise becomes immune to eavesdropping.

Only the authorized receiver can retrieve the transmitted data, since it uses all-optical means.

Decoding by the receiver can be implemented by two detection schemes: homodyne detection or direct detection. For secure applications, the authorized user has to decode the phase mask by optical means. Wrong phase masks leads to a permanent destruction of the signal due to incoherent addition process. In addition to encryption application, the same optical system (without the phase encoding), can be used to generate a broadband signal that can be coherently combined into narrow signal with larger SNR. The advantage of such transmission scheme can be either stealthiness, or for limited link budget applications and/or limited output power transmission cases, for example, to avoid regulatory constrains (where the ratio between power and wavelength is much lower).

Figure 2:
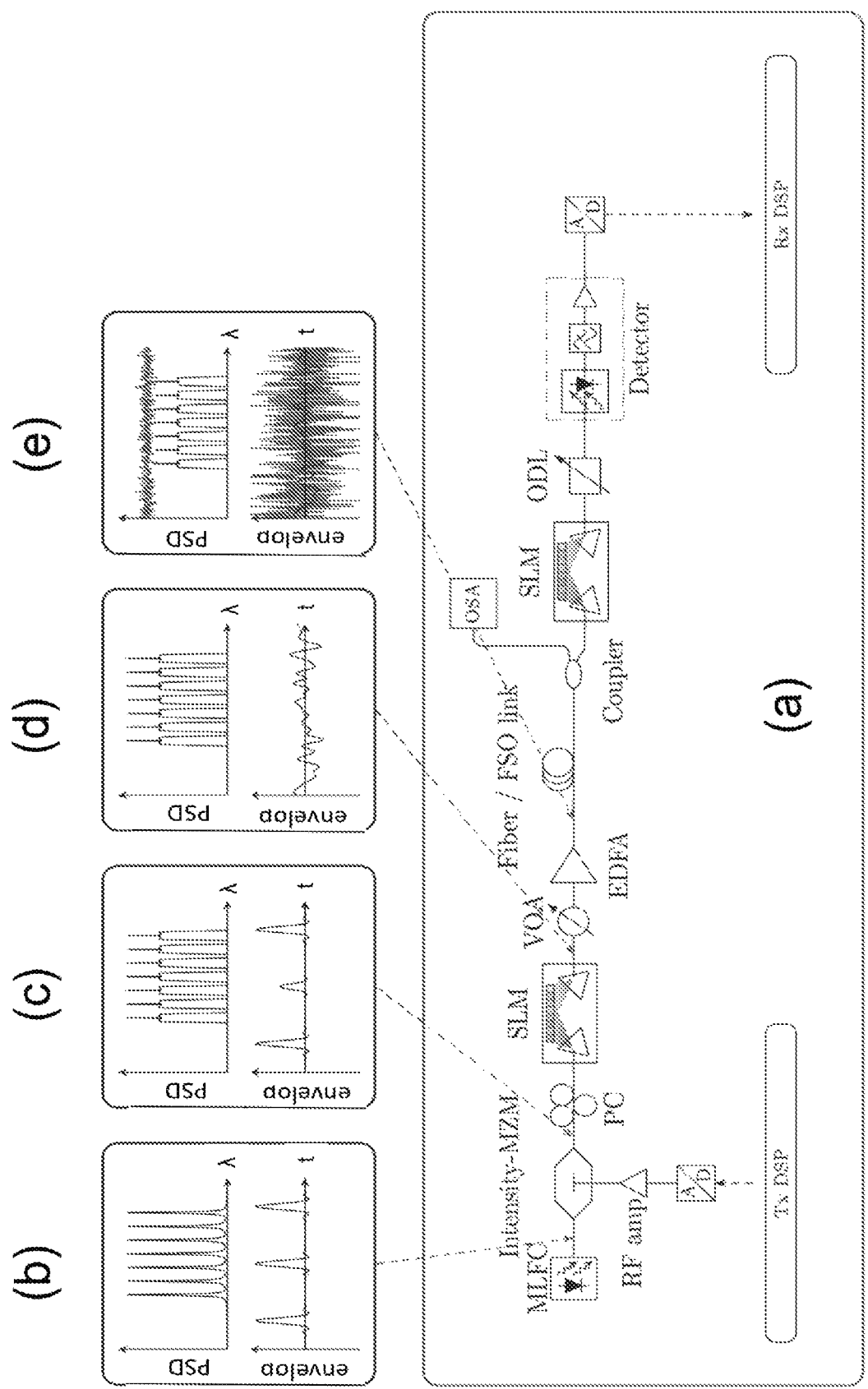
FIG. 2 illustrates the system functional block diagram with intensity modulation and direct detection.

Two possible implementations of the proposed technique are depicted in FIGS. 1 and 2.

FIG. 1 illustrates the system functional block diagram of a coherent transmission system with complex modulation and "Multi-Homodyne" detection, using Mode Locked Frequency Comb (MLFC) as both the laser transmitter and as the Local Oscillator (LO). At the transmitter (Tx) side, the MLFC feeds a multicarrier comb signal to a Dual Parallel Mach-Zehnder Modulator (DP-MZM) and which received complex modulating signal (using In-Phase and Quadrature channels) from the transmitter's DSP (Tx DSP). The modulated signal is then fed into a Polarization Controller (PC) to adjust the polarization of the modulated optical signal (to align the signal and the LO before they are mixed together at a coherent receiver) and then into a Spatial Light Modulator (SLM), which performs phase encoding. Then the optical modulated optical signal is input to a Variable Optical Attenuator (VOA), which attenuates it to a level that can be masked by noise, followed by an Erbium-Doped Fiber Amplifier (EDFA) that adjusts the OSNR levels before transmission, such that the encoded information will be covered by noise and then the encoded information is transmitted to the receiver (Rx) over an optical channel, which may be a wired channel such as glass or plastic fiber, as well as free-space optics (FSO) communication system or a random media.

It should be noted that following the MZM, an all-optical phase and/or amplitude processor is used for phase and/or amplitude encoding. The optical bandwidth of the encoder covers the applicable spectrum of the MLFC, and can induce a temporal phase retardation to spread each symbol over multiple symbol's Unit Intervals (UIs). In secure applications, the optical processor applies a spectral phase mask which in turn stands for the encryption key. In both coherent and direct detection schemes, a controlled noise mechanism is used to hide the signal below the noise level. Whereas in marginal link budget applications, the noise is introduced by the channel itself or by a pre/post-amplification devices.

Multi-Homodyne Detection

At the receiver side Rx, another SLM is used for decoding the phase masking using a decoding key which is the inverse of the encoding key used for phase encoding of all modulated carriers, such that the information carried by each carrier is no longer masked and the phase/amplitude encoding is removed. In "Multi-homodyne" coherent-detection, multiple spectral replicas of the signal are coherently added to the baseband, to reinforce the signal-to-noise ratio. Detection is implemented by mixing the incoming signal with a MLFC that functions as a LO. The LO is temporally adjusted by an Optical Delay Line (ODL) in order to synchronize its ultra-short pulses with the signal's modulated ultra-short pulses.

Subsequently, at the output of an Integrated Coherent Receiver (ICR), a Low-Pass electrical Filter (LPS) filters the baseband signal to be further sampled by an Analog-To-Digital Converter (ADC) and processed by a Digital Signal Processing (Rx-DSP) unit.

In "Multi-Homodyne" coherent detection, optical processing-gain is obtained by combining the received signal with a mode-locked optical frequency comb which operates as the optical "multi-local oscillator", and applying opto-electronic coherent detection of the combined optical signal. Baseband filtering of the "multi-homodyne" mixed signal between the identical frequencies of the two frequency combs by is done by passing the photo-detected signal through a receiver of bandwidth that is narrower than the frequency spacing between the modes, and filtering out all the detected cross-term mixing between the two frequency combs (since the detected cross-terms contain energy at frequencies larger than the baseband filter).

FIG. 2 illustrates the system functional block diagram of an incoherent transmission system with intensity modulation and direct detection.

"Multi-Direct Detection"

In the case of "Multi-direct-detection", a photodiode is used to detect the signal's intensity (rather than using the ICR in the system of FIG. 1). Detection is done by applying self-homodyne opto-electronic direct-detection of the optical signal. The baseband of the "multi-direct-detection" signal is filtered and the photo-detected signal is passes through a receiver with a bandwidth that is narrower than the frequency spacing between the modes. This way, all the cross-term mixing products between the multi-frequencies of the comb (which contain energy at frequencies larger than the baseband filter) are filtering out.

In both systems, the detected electrical Signal-To-Noise (SNR) is considerably improved compared to the line optical-signal-to-noise ratio (OSNR). The ratio between the OSNR and the electrical SNR is referred to as "processing-gain". The processing-gain is directly related to the number of applicable spectral modes of the MLFC. Also, in both systems, a MLFC is used as a multi-carrier source, modulated by the desired data. The data can be a complex symbols stream in the coherent case, or an intensity modulated data in the direct detection case. Modulation rate can be tuned up to the MLFC's repetition rate. The system supports high order constellations as well as dual-polarization modulation.

Experimental results are shown in "40 Gbps stealthy and encrypted optical coherent transmission using gain switched frequency comb and multi-homodyne coherent detection", Wohlgemuth et. al., 2020 Optical Society of America under the terms of the OSA Open Access Publishing Agreement.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

REFERENCES

1. H. F. M. Z. Iqbal and N. Belhadj, "Optical fiber tapping: Methods and precautions," IEEE, 8th Int. Conf. on High Capacity Opt. Networks Enabling Technol. (HONET) pp. 164-168 (2011).
2. K. Shaneman and S. Gray, "Optical network security: technical analysis of fiber tapping mechanisms and methods for detection & prevention," IEEE Mil. Commun. Conf. (MILCOM) (2004).
3. R. Rejeb, M. S. Leeson, and R. J. Green, "Fault and attack management in all-optical networks," IEEE Commun. Mag. 44, 79-86 (2006).
4. F. Arute, K. Arya, R. Babbush, D. Bacon, J. Bardin, R. Barends, R. Biswas, S. Boixo, F. Brandao, D. Buell, B. Burkett, Y. Chen, Z. Chen, B. Chiaro, R. Collins, W. Courtney, A. Dunsworth, E. Farhi, B. Foxen, and J. Martinis, "Quantumsupremacy using a programmable superconducting processor," Nature 574, 505-510 (2019).
5. M. P. Fok, Z. Wang, Y. Deng, and P. R. Prucnal, "Optical Layer Security in Fiber-Optic Networks," IEEE Trans. Inf. Forensics Secur. 6, 725-736 (2011).
6. P. J. Winzer, D. T. Neilson, and A. R. Chraplyvy, "Fiber-optic transmission and networking: the previous 20 and the next 20 years invited," Opt. Express 26, 24190-24239 (2018).
7. A. Argyris, D. Syvridis, L. Larger, V. Annovazzi-Lodi, P. Colet, I. Fischer, J. Garcia-Ojalvo, C. Mirasso, L. Pesquera, and A. Shore, "Chaos-based communications at high bit rates using commercial fibre-optic links," Nature 438, 343-346 (2005).
8. B. Korzh, C. Lim, R. Houlmann, N. Gisin, M.-J. Li, D. Nolan, B. Sanguinetti, R. Thew, and H. Zbinden, "Provably Secure and Practical Quantum Key Distribution over 307 km of Optical Fibre," Nat. Photonics 9 (2014).
9. S. S. Y. Aikawa and H. Uenohara, "Demonstration of all-optical divider circuit using soa-mzi-type xor gate and feedback loop for forward error detection," j. Light. technol. 29, 2259-2266 (2011).
10. H. C. J. J. J. L. A. B. P. Q. Wang, G. Zhu and N. K. Dutta, "Study of all-optical xor using mach-zehnder interferometer and differential scheme," IEEE J. Quantum Electron. 40, 703-710 (2004).
11. T. H. Shake, "Security performance of optical CDMA Against eavesdropping," J. Light. Technol. 23, 655-670 (2005).
12. N. Kostinski, K. Kravtsov, and P. R. Prucnal, "Demonstration of an all-optical ocdma encryption and decryption system with variable two-code keying," IEEE Photonics Technol. Lett. 20, 2045-2047 (2008).
13. S. Etemad, A. Agarwal, T. Banwell, J. Jackel, R. Menendez, and P. Toliver, "OCDM-based photonic layer 'security' scalable to 100 Gbits/s for existing WDM networks [Invited]," J. Opt. Netw. 6, 948-967 (2007).
14. S. Etemad, A. Agarwal, T. Banwell, G. D. Crescenzo, J. Jackel, R. Menendez, and P. Toliver, "An Overlay Photonic Layer Security Approach Scalable to 100 Gb/s," IEEE Commun. Mag. 46, 32-39 (2008).
15. B. Wu and E. Narimanov, "A method for secure communications over a public fiber-optical network," IEEE Photonics Technol. Lett. 14, 3738-3751 (2006).
16. H. K. Lo, M. Curty, and K. Tamaki, "Secure quantum key distribution," Nat. Photonics 8, 595-604 (2014).
17. J. A. Salehi, A. M. Weiner, and J. P. Heritage, "Coherent ultrashort light pulse code-division multiple access communication systems," J. Light. Technol. 8, 478-491 (1990).
18. K. Kitayama, Xu Wang, and Naoya Wada, "OCDMA over WDM PON-solution path to gigabit-symmetric FTTH," J. Light. Technol. 24, 1654-1662 (2006).
19. M. Imran, P. M. Anandarajah, A. Kaszubowska-Anandarajah, N. Sambo, and L. Potí, "A survey of optical carrier generation techniques for terabit capacity elastic optical networks," IEEE Commun. Surv. Tutorials 20, 211-263 (2018).
20. V. Torres-Company, J. Schroder, A. Fülöp, M. Mazur, L. Lundberg, O. B. Helgason, M. Karlsson, and P. A. Andrekson, "Laser frequency combs for coherent optical communications," J. Light. technol. 37, 1663-1670 (2019).
21. D. M. Marom, D. T. Neilson, D. S. Greywall, C.-S. Pai, N. R. Basavanhally, V. A. Aksyuk, D. O. Lopez, F. Pardo, M. E. Simon, Y. Low, P. Kolodner, and C. A. Bolle, "Wavelength-Selective 1×K Switches Using Free-Space Optics and MEMS Micromirrors: Theory, Design, and Implementation," J. Light. Technol. 23, 1620 (2005).
22. W. Huang, M. H. M. Nizam, I. Andonovic, and M. Tur, "Coherent optical cdma (ocdma) systems used for high-capacity optical fiber networks-system description, otdma comparison, and ocdma/wdma networking," j. Light. technol. 18, 765-778 (2000).
23. W. Huang and I. Andonovic, "Coherent optical pulse cdma systems based on coherent correlation detection," IEEE Transactions on Commun. 47, 261-271 (1999).
24. Z. Jiang, D. E. Leaird, and A. M. Weiner, "Experimental Investigation of Security Issues in O-CDMA," J. Light. Technol. 24, 4228-4234 (2006).
25. Y. T. M. P. F. B. S. D. K. B. Wu, Z. Wang and P. Prucnal, "Optical steganography based on amplified spontaneous emission noise," Opt. Express 21, 2065-2071 (2013).
26. M. P. C. B. Wu, A. N. Tait and P. R. Prucnal, "Wdm optical steganography based on amplified spontaneous emission noise," Opt. Lett. 39, 5925-5928 (2014).
27. T. Yeminy, D. Sadot, and Z. Zalevsky, "Spectral and temporal stealthy fiber-optic communication using sampling and phase encoding," Opt. Express 19, 20182-20198 (2011).
28. E. Wohlgemuth, Y. Yoffe, T. Yeminy, Z. Zalevsky, and D. Sadot, "Demonstration of coherent stealthy and encrypted transmission for data center interconnection," Opt. Express 26, 7638-7645 (2018).
29. P. M. Anandarajah, R. Maher, Y. Q. Xu, S. Latkowski, J. O'Carroll, S. G. Murdoch, R. Phelan, J. O'Gorman, and L. P. Barry, "Generation of coherent multicarrier signals by gain switching of discrete mode lasers," IEEE Photonics J. 3, 112-122 (2011).
30. R. Zhou, T. N. Huynh, V. Vujicic, P. M. Anandarajah, and L. P. Barry, "Phase noise analysis of injected gain switched comb source for coherent communications," Opt. Express 22, 8120-8125 (2014).
31. R. Zhou, S. Latkowski, J. O'Carroll, R. Phelan, L. P. Barry, and P. Anandarajah, "40 nm wavelength tunable gain-switched optical comb source," Opt. Express 19, B415-B420 (2011).
32. P. D. Lakshmijayasimha, A. Kaszubowska-Anandarajah, E. P. Martin, P. Landais, and P. M. Anandarajah, "Expansion and phase correlation of a wavelength tunable gain-switched optical frequency comb," Opt. Express 27, 16560-16570 (2019).
33. M. D. G. Pascual, R. Zhou, F. Smyth, P. M. Anandarajah, and L. P. Barry, "Software reconfigurable highly flexible gain switched optical frequency comb source," Opt. Express 23, 23225-23235 (2015).
34. M. D. Gutierrez Pascual, V. Vujicic, J. Braddell, F. Smyth, P. Anandarajah, and L. Barry, "Photonic integrated gain switched optical frequency comb for spectrally efficient optical transmission systems," IEEE Photonics J. 9, 1-8 (2017).
35. M. Mazur, A. Lorences-Riesgo, J. Schröder, P. A. Andrekson, and M. Karlsson, "High Spectral Efficiency PM-128QAM Comb-Based Superchannel Transmission Enabled by a Single Shared Optical Pilot Tone," j. Light. technol. 36, 1318-1325 (2018).
36. E. Wohlgemuth, Y. Yoffe, P. Nadimi Goki, M. Imran, F. Fresi, L. Poti, and D. Sadot, "Demonstration of Stealthy and Encrypted Optical Transmission Below Adjacent 50 GHz DWDM Channels," IEEE Photonics Technol. Lett. 32, 581-584 (2020).
37. L. E. Nelson, G. Zhang, M. Birk, C. Skolnick, R. Isaac, Y. Pan, C. Rasmussen, G. Pendock, and B. Mikkelsen, "A robust real-time 100 G transceiver with soft-decision forward error correction [Invited]," IEEE/OSA J. Opt. Commun. Netw. 4, B131-B141 (2012).
38. G. Tzimpragos, C. Kachris, I. B. Djordjevic, M. Cvijetic, D. Soudris, and I. Tomkos, "A Survey on FEC Codes for 100 G and Beyond Optical Networks," IEEE Commun. Surv. Tutorials 18, 209-221 (2016).

39. K. Roberts, Q. Zhuge, I. Monga, S. Gareau, and C. Laperle, "Beyond 100 Gb/s: capacity, flexibility, and network optimization [Invited]," IEEE/OSA J. Opt. Commun. Netw. 9, C12-C23 (2017).
40. G. P. Agrawal, Fiber-Optic Communications Systems, Wiley series in microwave and optical engineering (Wiley, New York, 2002).

The invention claimed is:

1. A method for transmitting data carrying optical information over an optical channel, comprising:
   a) providing an optical transmitter consisting of:
      a.1) a light source being a Mode-Locked Optical Frequency Comb (MLFC) for generating a frequency comb of multiple carriers, each of which being modulated by a baseband signal;
      a.2) an optical modulator for modulating each and all of said multiple carriers in a modulation bandwidth extending up to the modes' frequency spacing between said multiple carriers;
      a.3) performing all-optical encoding of the modulated carriers by manipulating the optical amplitude and/or phase and/or polarization of all optically modulated carriers; and
   b) transmitting, by said optical transmitter, said encoded modulated carriers to an optical receiver, over an optical channel.

2. A The method according to claim 1, further comprising masking encoded modulated carriers before transmission by:
   a) attenuating the power of encoded modulated carriers; and
   b) optionally, adding noise to said attenuated encoded modulated carriers, in a level being optionally above said power.

3. The method according to claim 1, further comprising performing all-optical de-coding of the modulated carriers by de-manipulating the optical phase and/or the amplitude of all optically modulated carriers.

4. The method according to claim 1, further comprising obtaining processing-gain by performing optical coherent addition of all the optical modes of the frequency comb of multiple carriers using "multi-homodyne" detection.

5. The method according to claim 4, wherein "multi-homodyne" detection is performed by:
   a) combining the received signal with a mode-locked optical frequency comb which operates as the optical multi-frequency local oscillator;
   b) applying opto-electronic coherent detection of the combined optical signal;
   c) performing baseband filtering of the "multi-homodyne" mixed signal between the identical frequencies of the two frequency combs at the receiver and the transmitter, by passing the photo-detected signal through a receiver of bandwidth narrower than the frequency spacing between the modes;
   d) filtering out all the detected cross-term mixing products between the two frequency combs.

6. The method according to claim 1, wherein the receiver side detects the baseband information using "Multi-direct-detection" by:
   a) applying self-homodyne opto-electronic direct-detection of the optical signal;
   b) Performing baseband filtering of the "multi-direct-detection" signal;
   c) passing the photo-detected signal through a receiver of bandwidth narrower than the frequency spacing between the modes, thereby filtering out all the cross-term mixing between the multi-frequencies of the comb.

7. The method according to claim 4, wherein multiple spectral replicas of the signal are coherently added to the baseband, to reinforce the signal-to-noise ratio.

8. The method according to claim 1, wherein the opto-electronic receiver has a baseband bandwidth, rather than a full optical bandwidth.

9. The method according to claim 1, further comprising applying a spectral phase mask being an encryption key, for obtaining secure transmission.

10. The method according to claim 1, further comprising using processing-gain for optoelectronic amplification at the receiver, for limited link budget applications and/or limited output power transmission.

11. The method according to claim 1, wherein the optical channel is a wired or wireless channel is selected from the group of:
    glass;
    plastic fiber;
    Free-Space Optics (FSO);
    random media.

12. The method according to claim 1, wherein the modulation is complex or intensity modulation.

13. The method according to claim 1, wherein the optical bandwidth of the all-optical encoder may cover the applicable spectrum of the MLFC, and can induce a temporal phase retardation to spread each symbol over multiple symbol's unit intervals (UIs).

14. The method according to claim 1, further comprising operating at high optical-noise conditions at very low, possibly negative, Optical-Signal-To-Noise-Ratio (OSNR), followed by performing high optical processing-gain at the receiver side.

15. The method according to claim 4, wherein the detected cross-terms contain energy at frequencies larger than the baseband filter.

16. An optical system for transmitting data carrying optical information over an optical channel, comprising:
    a) an optical transmitter, that comprises:
       a.1) a light source being a Mode-Locked Optical Frequency Comb (MLFC) for generating a frequency comb of multiple carriers, each of which being modulated by a baseband signal;
       a.2) an optical modulator for modulating each and all of said multiple carriers in a modulation bandwidth extending up to the modes' frequency spacing between said multiple carriers;
       a.3) an optical encoder for all-optical encoding of the modulated carriers by manipulating the optical amplitude and/or phase of all optically modulated carriers, wherein said transmitter is adapted to transmit, by said optical transmitter, said encoded modulated carriers to an optical receiver, over an optical channel; and
    b) an optical receiver comprising means for performing coherent addition by:
       b.1) combining the received signal with a mode-locked optical frequency comb which operates as the optical multi-frequency local oscillator;
       b.2) applying opto-electronic coherent detection of the combined optical signal;
       b.3) performing baseband filtering of the "multi-homodyne" mixed signal between the identical frequencies of the two frequency combs at the receiver and the transmitter, by passing the photo-detected signal through a receiver of bandwidth narrower than the frequency spacing between the modes;

b.4) filtering out all the detected cross-term mixing products between the two frequency combs.

17. An optical system for transmitting data carrying optical information over an optical channel, comprising:

a) an optical transmitter, that comprises:
   a.1) a light source being a Mode-Locked Optical Frequency Comb (MLFC) for generating a frequency comb of multiple carriers, each of which being modulated by a baseband signal;
   a.2) an optical modulator for modulating each and all of said multiple carriers in a modulation bandwidth extending up to the modes' frequency spacing between said multiple carriers;
   a.3) an optical encoder for all-optical encoding of the modulated carriers by manipulating the optical amplitude and/or phase of all optically modulated carriers, wherein said transmitter is adapted to transmit, by said optical transmitter, said encoded modulated carriers to an optical receiver, over said optical channel; and b) an optical receiver comprising a photodiode for performing incoherent detection by:
   b.1) detecting the signal's intensity by applying self-homodyne opto-electronic direct-detection of the modulated optical signal;
   b.2) filtering the baseband of the "multi-direct-detection" signal;
   b.3) filtering out all the cross-term mixing products between the multi-frequencies of the comb by passing the photo-detected signal through said optical receiver, said optical receiver having a bandwidth being narrower than the frequency spacing between modes.

18. The optical system according to claim 17, wherein the modulation is intensity modulation.

* * * * *